Feb. 22, 1949.   R. W. ESAREY   2,462,172
MOTOR CONSTRUCTION
Filed Nov. 19, 1945
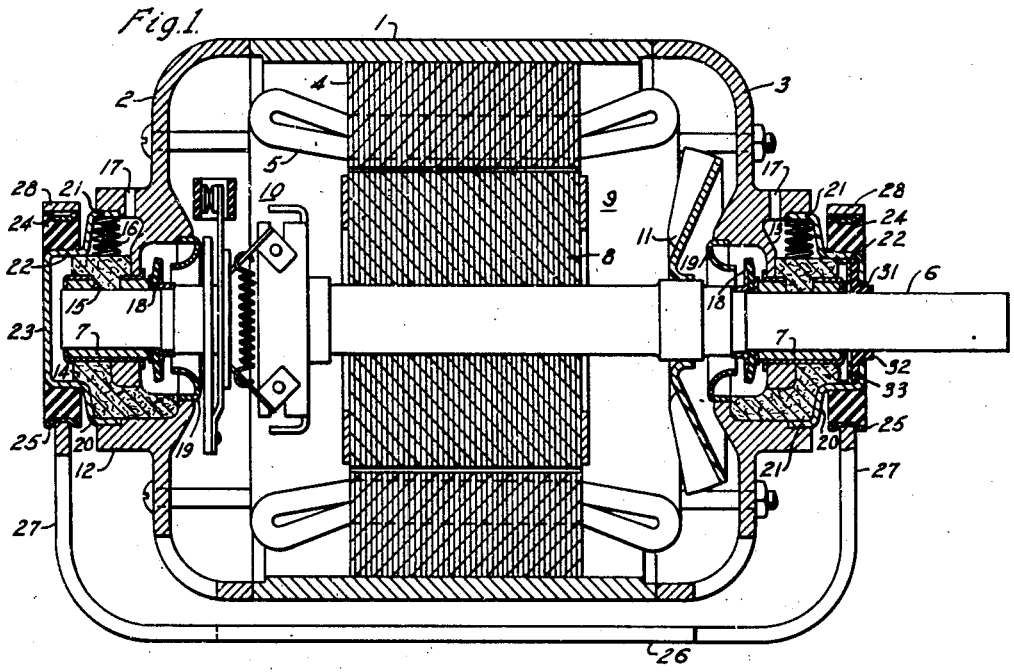
Fig. 1.
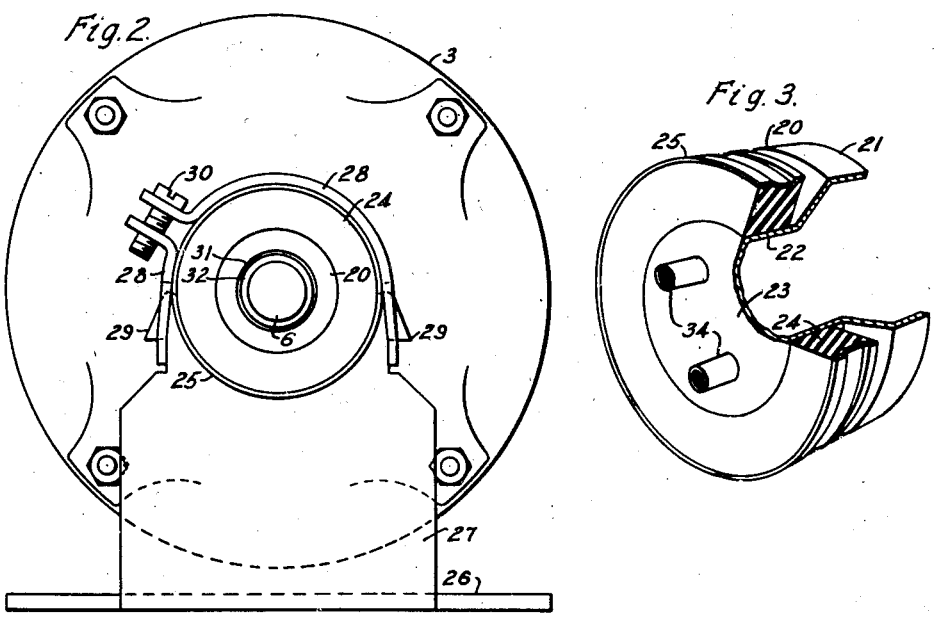
Fig. 2.
Fig. 3.
WITNESSES:
INVENTOR
Raymond W. Esarey.
BY
ATTORNEY Patented Feb. 22, 1949

2,462,172

UNITED STATES PATENT OFFICE 2,462,172

MOTOR CONSTRUCTION

Raymond W. Esarey, Lima, Ohio, assignor to Westinghouse Electric Corporation, East Pittsburgh, Pa., a corporation of Pennsylvania Application November 19, 1945, Serial No. 629,655

6 Claims. (Cl. 172—36)

The present invention relates to the construction of small electric motors, and, more particularly, to an improved construction for the bearing-supporting and motor-mounting means of such motors.

The invention is especially directed to small electric motors, such as fractional horsepower motors, although it will be obvious that its usefulness is not restricted to any particular size or type of motor. In small motors provided with sleeve type bearings, the bearings are lubricated by means of oil-saturated wicking placed around the bearing, and contacting the shaft through a window, or opening, in the bearing to carry the oil to the bearing clearance between the shaft and bearing. The wicking is held in place and in contact with the shaft by means of a spring. In the conventional construction, the bearing is supported in a bearing boss or protuberance on the end bracket of the motor with the wicking and spring disposed around the bearing within the boss. It is often desirable to provide a resilient mounting for single-phase motors of this type, to absorb the vibration resulting from the pulsating single-phase torque, and a resilient mounting ring, usually of rubber, is placed on the outer periphery of the bearing boss for this purpose. With this conventional construction, it is usually necessary, in assembling the motor, to insert the wicking and spring through a small opening in the bearing boss, such as an oil hole, and this is obviously a difficult operation which often results in improper placement of the wicking, or spring, or both. Such improper placement of the wicking or spring causes inadequate lubrication of the bearing, and often leads to early bearing failure.

The principal object of the present invention is to provide a construction for small electric motors with sleeve bearings, which will permit easy assembly of the wicking and spring in their proper places with respect to the bearing, and which is readily adapted for resilient mounting of the motor.

A further object of the invention is to provide a construction for small electric motors in which the bearing is supported in a recess in the motor bracket in such a manner that it is readily accessible for placement of the wicking and spring, and which includes a separate cap member for closing the recess to prevent the entrance of dust and dirt. In this way, the wicking and spring can easily be placed in their proper positions without having to pass them through a small opening, and the assembly is subsequently closed by placing the separate cap member in position. The cap member is designed so that a rubber mounting ring can be applied directly to the cap member to provide a resilient mounting for the motor, and the mounting ring is preferably bonded to the cap member, thus avoiding the necessity for special means for retaining the mounting ring in position, which was usually necessary in the conventional constructions. The cap member is also designed so that it is adapted to serve as a support for a capacitor, when applied to a capacitor motor, and it is also adaptable to motors which do not require resilient mounting merely by omitting the rubber mounting ring.

Other objects and advantages of the invention will be apparent from the following detailed description, taken in connection with the accompanying drawing, in which:

Figure 1 is a longitudinal sectional view of an electric motor embodying the invention;

Fig. 2 is an end view of the motor of Fig. 1, and

Fig. 3 is a perspective view of a cap member, partly cut away, and also illustrating a slight modification of the invention.

The invention is shown in the drawing embodied in a small electric motor, the particular motor shown for the purpose of illustration being a single-phase induction motor of the split-phase type, although it will be obvious that the invention is applicable to any type of electric motor. The motor shown in the drawing has a frame 1 closed at the ends by end brackets 2 and 3. A laminated stator core 4 is supported in the frame 1 and carries primary windings 5. The rotor member includes a shaft 6 supported in sleeve type bearings 7 mounted in the end brackets 2 and 3. A laminated rotor core 8 is mounted on the shaft 6 and carries a suitable secondary winding, shown as a squirrel-cage winding 9. A speed-responsive starting switch 10 of any suitable type is also mounted on the shaft 6, and a fan 11 may be secured to the shaft to circulate cooling air through the motor.

The bearing-supporting and motor-mounting means on the end brackets 2 and 3 are identical at both ends of the machine, and will be described in detail for one end only. Each of the end brackets 2 and 3 has a central bearing-supporting portion which includes an extending annular wall portion 12, forming a recess which is open at its outer end. The end-wall portion 13 of the bracket, within the recess formed by the annular wall 12, has a central opening in which the bearing 7 is supported. The bearing is lubricated by means of oil-saturated wicking 14, which is placed around the bearing, as shown, within the recess, and which contacts the shaft 6 through a window 15 in the bearing. The wicking 14 is held in position, and in contact with the shaft 6, by means of a spring 16 disposed in the recess above the bearing. Oil may be supplied to the wicking 14, as needed, through an oil hole 17.

Oil escaping from the bearing 7 may be prevented from getting into the motor itself by any suitable means, such as an oil thrower 18, mounted on the shaft 6 adjacent the bearing, and an oil catcher member 19 mounted in the bracket adjacent the oil thrower. Oil thrown off the shaft by the oil thrower 18 is caught by the oil catcher 19 and returned to the bearing by the wicking 14, which extends into the oil catcher 19 through an opening in the lower part of the wall 13. The oil thrower 18 is preferably made of rubber, in order to facilitate assembly of the motor by making it possible for the oil thrower to be forced through the smaller central opening of the annular oil catcher 19, as more fully described, and claimed, in a copending application of W. H. Mitchell, Serial No. 624,285, filed October 24, 1945, and assigned to Westinghouse Electric Corporation.

The open outer end of the recess in which the bearing is supported is closed by a metal cap member 20, which is pressed into the annular wall portion 12 after the wicking 14 and spring 16 have been placed in position. As clearly shown in Figs. 1 and 3, the cap member 20 has a peripheral portion 21 adapted to fit tightly into the annular wall 12, so that the cap member can be pressed in place and positively retained in position. The cap member 20 also has an extending, generally cylindrical portion 22, of smaller diameter than the peripheral portion 21, which is closed by the substantially plane end surface 23 of the cap 20.

The cylindrical portion 22 of the cap is adapted to receive a resilient mounting ring 24, which may be made of any suitable resilient material, preferably either natural or synthetic rubber. The mounting ring 24 might be retained in position on the cap 20 in any suitable manner, but it is preferred to bond the rubber mounting ring to the cylindrical portion 22 of the cap 20, thus permanently attaching the mounting ring to the cap and avoiding the necessity of special retaining means for the ring. An outer metal ring 25, having a shallow central groove, is bonded to the outside periphery of the resilient mounting ring 24.

The motor is supported on a base or support 26 having vertically extending portions 27 at each end, which are shaped to engage in the shallow grooves of the rings 25 on the resilient mounting rings 24, as shown in Figs. 1 and 2. The motor is held in position on the support 26 by means of clamping members 28 which extend around the mounting rings 24 and engage lugs 29 on the portions 27 of the base 26. The clamping members 28 are clamped together by means of a clamping screw 30, which passes through one of the clamping members 28 and is threaded in the other.

As previously stated, both ends of the motor are identical so far as the bracket construction and bearing-supporting means are concerned. Since it is necessary, however, for the shaft 6 to extend out of the motor at one end, the cap member 20 at that end differs from the cap at the other end by having a central opening 31 for the shaft to pass through. This cap member is otherwise identical with the cap member 20 described above. In order to prevent leakage of oil from this end of the motor, a shaft seal is preferably provided consisting of a rubber washer 32, which engages the shaft 6, and which is held in position by means of a cup-shaped metal retaining washer 33 pressed into the cap member 20.

In the case of a capacitor motor, it is often desirable to mount the capacitor on the end of the motor inside the resilient mounting ring, as disclosed in a patent to C. G. Veinott, No. 2,253,405. The present construction is well adapted to this arrangement, and, as shown in Fig. 3, provision may readily be made for supporting a capacitor on the cap member 20. For this purpose, two internally threaded, tubular lugs 34 are secured to the flat outer surface 23 of the cap member by spot welding, or in any other suitable manner, and a capacitor can then easily be mounted on the motor by means of these lugs, in the manner described in the above-mentioned Veinott patent.

It should now be apparent that a construction has been provided for small electric motors which has many advantages. Assembly of the motor is greatly facilitated by this new construction, since the wicking 14 and spring 16 can easily be placed in the proper location, as the space around the bearing is readily accessible, so that it is not necessary to pass the wicking and spring through a small opening, as was necessary in prior constructions. Thus, the possibility of misplacement of the wicking or spring is avoided, and after the cap member 20 is pressed into position, the bearing recess is effectively closed, and the bearing is protected against the entrance of dust or dirt to the same extent as in the conventional constructions using a solid, integral bearing boss.

The cap member 20 is adapted to perform three functions, since it serves as a closure for the bearing recess to keep out dust and dirt, it carries the resilient mounting ring for the motor and, in the case of a capacitor motor, it also may serve as a capacitor support. This combination of functions in a single element permits a substantial reduction in cost, and a simpler design than has previously been possible. The use of the cap member 20 is very desirable in resiliently mounted motors, since the resilient mounting ring is carried directly on the cap member itself, and preferably bonded to it, thus avoiding the necessity of separate retaining means for the mounting ring. The new construction is equally adaptable, however, to motors which do not require resilient mounting, since exactly the same construction can be used with the mounting ring 24 omitted. Thus, the same cap member design can be used for either resiliently or rigidly mounted motors, with a resultant saving in die cost.

A specific embodiment of the invention has been shown and described for the purpose of illustration, but it will be apparent that the invention is capable of various other modifications and embodiments, and it is to be understood, therefore, that the invention is not limited to the specific details of construction shown, but in its broadest aspects it includes all equivalent embodiments and modifications that come within the scope of the appended claims.

I claim as my invention:

1. A dynamo-electric machine having a stator member and a rotor member, said stator member including an end bracket, said end bracket having a central recess therein extending to the outer side of the end bracket, a bearing for the rotor member supported in the end bracket within said recess, the diameter of all parts of the recess being greater than the diameter of the bearing to provide an annular space around the bearing, lubricating means for the bearing disposed in said annular space, a cap member fitting in the recess and closing the annular space, and resilient mounting means carried on said cap member for resiliently supporting the machine.

2. A dynamo-electric machine having a stator member and a rotor member, said stator member including an end bracket, said end bracket having a central recess therein extending to the outer side of the end bracket, a bearing for the rotor member supported in the end bracket within said recess, the diameter of all parts of the recess being greater than the diameter of the bearing to provide an annular space around the bearing, lubricating means for the bearing disposed in said annular space, a cap member fitting in the recess and closing the annular space, said cap member having a longitudinally extending portion, and a resilient mounting ring carried on said extending portion of the cap member for resiliently supporting the machine.

3. A dynamo-electric machine having a stator member and a rotor member, said stator member including an end bracket, a generally circular wall portion extending longitudinally from the end bracket, a bearing for the rotor member supported in the end bracket within said circular wall portion, the inside diameter of all parts of the wall portion being greater than the diameter of the bearing to provide an annular space around the bearing opening to the outside of the end bracket, lubricating means for the bearing disposed in said annular space, a cap member fitting in the circular wall portion and closing the annular space, and resilient mounting means carried on said cap member for resiliently supporting the machine.

4. A dynamo-electric machine having a stator member and a rotor member, said stator member including an end bracket, a generally circular wall portion extending longitudinally from the end bracket, a bearing for the rotor member supported in the end bracket within said circular wall portion, the inside diameter of all parts of the wall portion being greater than the diameter of the bearing to provide an annular space around the bearing opening to the outside of the end bracket, lubricating means for the bearing disposed in said annular space, a cap member fitting in the circular wall portion and closing the annular space, said cap member having a longitudinally extending portion, and a resilient mounting ring carried on said extending portion of the cap member for resiliently supporting the machine.

5. A dynamo-electric machine having a stator member and a rotor member, said rotor member including a shaft, said stator member including two end brackets disposed at opposite ends thereof, each of said end brackets having a central recess therein extending to the outer side of the end bracket, a bearing for said shaft supported in each end bracket within said recess, the diameter of all parts of the recess being greater than the diameter of the bearing to provide an annular space around the bearing opening to the outside of the end bracket, lubricating means for the bearings disposed in said annular spaces in each end bracket, cap members fitting in the recesses of both end brackets and closing the annular spaces, one of said cap members having an opening for the shaft and sealing means for preventing escape of lubricant, and resilient mounting means carried on the cap members for resiliently supporting the machine.

6. A dynamo-electric machine having a stator member and a rotor member, said rotor member including a shaft, said stator member including two end brackets disposed at opposite ends thereof, each of said end brackets having a central recess therein extending to the outer side of the end bracket, a bearing for said shaft supported in each end bracket within said recess, the diameter of all parts of the recess being greater than the diameter of the bearing to provide an annular space around the bearing opening to the outside of the end bracket, lubricating means for the bearings disposed in said annular spaces in each end bracket, cap members fitting in the recesses of both end brackets and closing the annular spaces, one of said cap members having an opening for the shaft and sealing means for preventing escape of lubricant, said cap members having longitudinally extending portions, and resilient mounting rings carried on said extending portions of the cap members for resiliently supporting the machine.

RAYMOND W. ESAREY.

REFERENCES CITED

The following references are of record in the file of this patent:

UNITED STATES PATENTS

| Number | Name | Date |
|---|---|---|
| 2,078,783 | Welch | Apr. 27, 1937 |
| 2,113,020 | Geyer | Apr. 5, 1938 |
| 2,209,477 | Reibel | July 30, 1940 |